United States Patent
Autran et al.

(10) Patent No.: US 9,126,484 B2
(45) Date of Patent: Sep. 8, 2015

(54) METHOD FOR MANUFACTURING A HUMAN-MACHINE INTERFACE FOR A MOTOR VEHICLE, AND HUMAN-MACHINE INTERFACE PRODUCED BY SAID METHOD

(75) Inventors: Frédéric Autran, Paris (FR); Ziad El Khoury, Antony (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 326 days.

(21) Appl. No.: 13/384,818

(22) PCT Filed: Jul. 7, 2010

(86) PCT No.: PCT/FR2010/000496
§ 371 (c)(1),
(2), (4) Date: Jun. 6, 2012

(87) PCT Pub. No.: WO2011/010008
PCT Pub. Date: Jan. 27, 2011

(65) Prior Publication Data
US 2012/0235932 A1   Sep. 20, 2012

(30) Foreign Application Priority Data
Jul. 21, 2009   (FR) .................................... 09 55087

(51) Int. Cl.
*G06F 3/041*   (2006.01)
*B60K 37/04*   (2006.01)
*G06F 3/0488*   (2013.01)

(52) U.S. Cl.
CPC ............ *B60K 37/04* (2013.01); *G06F 3/04886* (2013.01); *Y10T 29/49826* (2015.01)

(58) Field of Classification Search
CPC ... G06F 3/041; G06F 3/0416; G06F 3/04886; B60K 37/06
USPC ............. 345/156, 164, 173, 184; 361/679.01; 340/461
See application file for complete search history.

(56) References Cited

U.S. PATENT DOCUMENTS

| | | | | |
|---|---|---|---|---|
| 4,312,577 A | * | 1/1982 | Fitzgerald | 353/12 |
| 4,896,370 A | * | 1/1990 | Kasparian et al. | 455/77 |
| 5,416,705 A | * | 5/1995 | Barnett | 701/14 |
| 5,649,244 A | * | 7/1997 | Sato et al. | 396/287 |

(Continued)

FOREIGN PATENT DOCUMENTS

| | | |
|---|---|---|
| DE | 196 23 406 A1 | 1/1998 |
| GB | 2416338 A | 1/2006 |

(Continued)

OTHER PUBLICATIONS

International Search Report w/translation from PCT/FR2010/000496 dated Oct. 5, 2010 (4 pages).

*Primary Examiner* — Joe H Cheng
(74) *Attorney, Agent, or Firm* — Osha Liang LLP

(57) ABSTRACT

The present invention relates to a method for manufacturing human-machine interface (40) including an opening (48) for enabling a user to observe information displayed on the screen (44), characterized in that, each screen module (42) being provided with a specific control (52), various human-machine interfaces (40) are manufactured from the same screen modules (42) by arranging the screen modules (42) in the housings (46) housing a control board provided with at least one control and/or at least one indicator for a function separate from the screen.

12 Claims, 4 Drawing Sheets

(56) References Cited

U.S. PATENT DOCUMENTS

Figure 3:
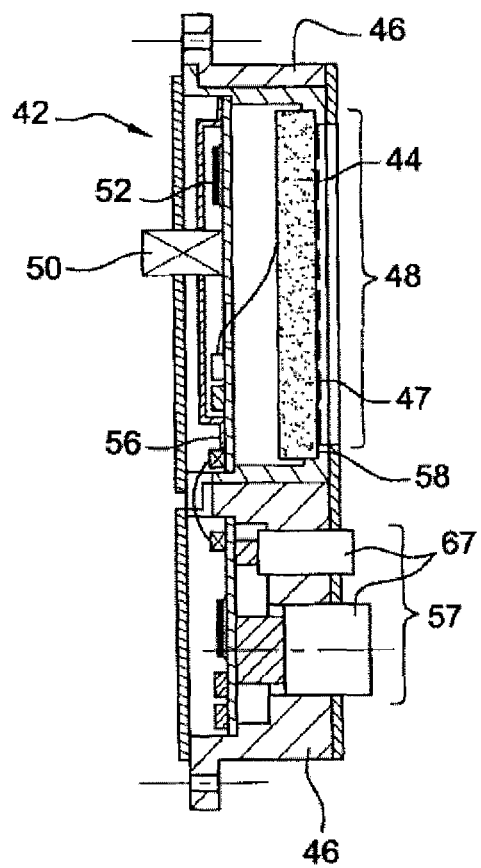

| | | | |
|---|---|---|---|
| 5,747,759 A * | 5/1998 | Lochmahr et al. | 200/5 R |
| 6,009,355 A * | 12/1999 | Obradovich et al. | 701/1 |
| 6,563,492 B1 * | 5/2003 | Furuya | 345/178 |
| 6,769,320 B1 * | 8/2004 | Bollgohn et al. | 73/866.3 |
| 6,819,990 B2 * | 11/2004 | Ichinose | 701/36 |
| 7,467,037 B2 * | 12/2008 | Donk et al. | 701/36 |
| 7,995,038 B2 * | 8/2011 | Vitale et al. | 345/173 |
| 2001/0029410 A1 * | 10/2001 | Obradovich | 701/1 |
| 2002/0149495 A1 * | 10/2002 | Schach et al. | 340/815.78 |
| 2003/0023353 A1 * | 1/2003 | Badarneh | 701/1 |
| 2005/0168330 A1 * | 8/2005 | Ono et al. | 340/461 |
| 2006/0017326 A1 * | 1/2006 | Hein et al. | 307/10.1 |
| 2006/0155431 A1 * | 7/2006 | Berg et al. | 701/2 |
| 2006/0181399 A1 * | 8/2006 | Sumiya | 340/461 |
| 2007/0069914 A1 * | 3/2007 | Lenneman et al. | 340/691.6 |
| 2007/0120693 A1 * | 5/2007 | Vij | 340/632 |
| 2007/0198137 A1 * | 8/2007 | Wille et al. | 701/1 |
| 2008/0158510 A1 * | 7/2008 | Tant et al. | 353/14 |
| 2008/0272623 A1 * | 11/2008 | Kadzban et al. | 296/216.01 |
| 2009/0132130 A1 * | 5/2009 | Kumon et al. | 701/49 |
| 2009/0174682 A1 * | 7/2009 | Bowden et al. | 345/173 |
| 2009/0189373 A1 * | 7/2009 | Schramm et al. | 280/731 |

FOREIGN PATENT DOCUMENTS

| | | |
|---|---|---|
| WO | 2004/068077 A2 | 8/2004 |
| WO | 2004/103772 A2 | 12/2004 |

* cited by examiner

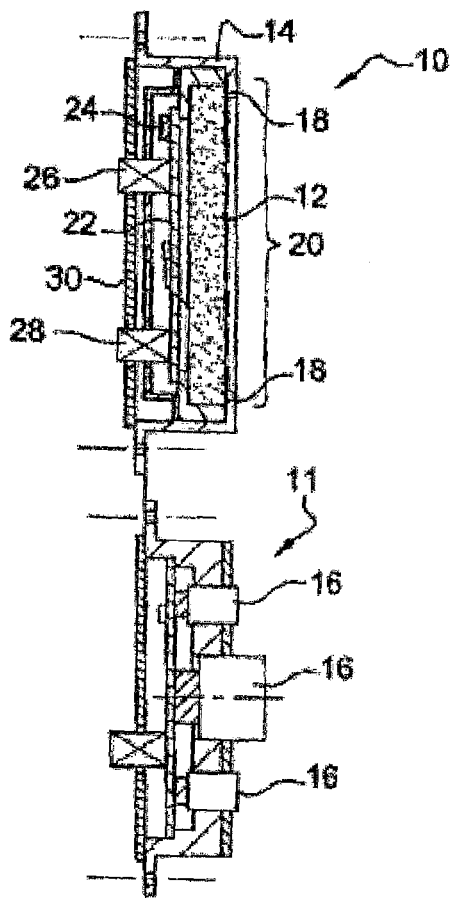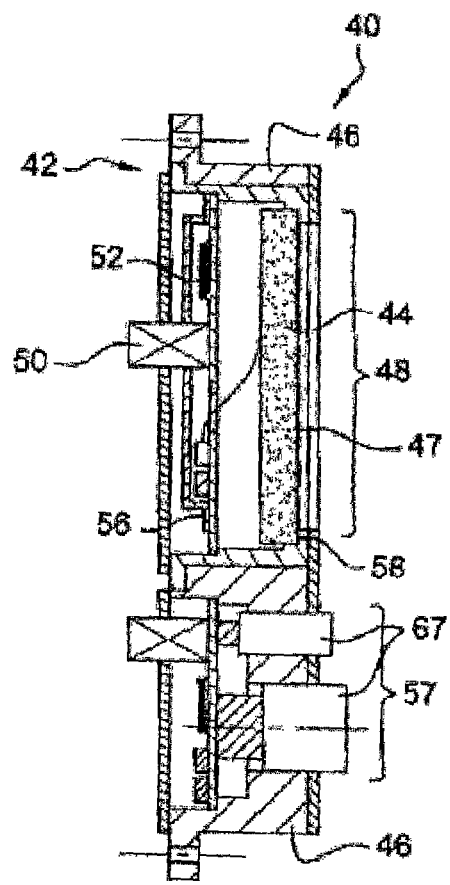
Fig. 1
Fig. 2

Before:

Vehicle A  Vehicle B  Vehicle C  Vehicle D

After:

Vehicle A  Vehicle B  Vehicle C  Vehicle D

METHOD FOR MANUFACTURING A HUMAN-MACHINE INTERFACE FOR A MOTOR VEHICLE, AND HUMAN-MACHINE INTERFACE PRODUCED BY SAID METHOD

CROSS-REFERENCE TO RELATED APPLICATIONS

This application is a National Stage Application filed under 35 U.S.C. §371 to PCT/FR2010/000496, filed on Jun. 6, 2012, which claims benefit of French Patent Application No. FR 0955087 in France on Jul. 21, 2009. These priority applications are hereby incorporated by reference in their entirety herein.

TECHNICAL FIELD OF THE INVENTION

The present invention relates to a method for manufacturing a man-machine interface for a motor vehicle and a man-machine interface obtained according to this method.

It is known practice to furnish motor vehicles, in a central zone of their instrument panel, with a man-machine interface comprising a multifunction screen making it possible to display information, for example relating to a multimedia drive or satellite positioning assistance.

In certain cases, this multifunction screen has a tactile screen allowing it to be controlled by simple contacts on the screen.

FIG. 1 shows in section such a known man-machine interface 10. Typically, this man-machine interface 10 comprises a screen 12, for example of TFT—for "Thin Film Transistor"— technology designed to display information for the use of a user.

This TFT screen 12 is placed in a housing, or cover, 14 incorporating all of the elements of the man-machine interface 10 in a single unit that can in a central zone of the instrument panel.

In this central zone, it is also known practice to house at least one other man-machine interface 11 making it possible to control items of equipment, such as air conditioning and/or a radio. In this case, such an interface 11 may comprise buttons 16 which may be of the push or rotary type.

The housing 14 has an opening 20 the shape of which corresponds to the contour of the screen 12, this opening 20 allowing a user of the man-machine interface 10 to view the information displayed on the screen 12.

This screen 12 is controlled by a printed circuit 22 and more precisely by a microcontroller 24 situated on the latter, connected to the screen 12 by an internal connection.

This microcontroller 24 also manages the communications with the onboard network of the vehicle via connectors 26 and 28 housed in the rear cover 30 of the man-machine interface 10.

Although such man-machine interfaces 10 furnished with a multifunction screen can easily incorporate an instrument panel of a vehicle by simple attachment in a dedicated housing in the form of a unit, it has many drawbacks.

A first drawback results from the contour 18 of the screen 20, which is usually rectangular, which limits the styles and/or the designs of instrument panel that are to incorporate this imposed form.

A second drawback results from the cost of manufacturing such man-machine interfaces, this cost being all the higher if the number of interfaces produced is low even though such a low number of interfaces produced makes it possible to have a specific type of man-machine interface associated with a model and/or a vehicle range.

The object of the present invention is to resolve at least one of the aforementioned drawbacks. It results from the finding that the use by the screen module of control means that are common to the whole man-machine interface makes it costly to use the same screen module with various interfaces because these control means must be adapted to the associated module for each man-machine interface.

For this reason, the present invention relates to a method for manufacturing man-machine interfaces comprising a module of a multifunction screen arranged in a housing having an opening designed to allow a user to view information displayed on this screen, characterized in that, since each screen module is furnished with specific control means, various man-machine interfaces are manufactured based on the same screen modules by arranging these screen modules in housings housing a control panel, furnished with at least one control and/or at least one indicator, of an independent function of the screen.

Such a manufacturing method has many advantages. Notably, it makes it possible to use one and the same screen module to manufacture various interfaces in a simple manner and with a limited cost since the control means of these interfaces do not have to be modified to take account of the screen module which comprises its own control means.

Moreover, such a method makes it possible to easily incorporate various items of equipment in a dashboard, these items of equipment being incorporated into one and the same housing as the screen module, thus forming a single unit for the screen module and for the control panel which are incorporated into this housing.

Finally, the invention makes it possible to associate various openings with one and the same screen module, which increases the possible styles and/or designs of the man-machine interfaces incorporating one and the same screen module.

Consequently, the cost of manufacturing a man-machine interface according to the invention is limited since a high number of interfaces can be produced using one and the same multifunction screen module, which reduces the cost of the latter.

According to one embodiment, various man-machine interfaces have various shapes of openings.

In one embodiment, various screen openings mask, in a distinct manner, the contour of the screen with respect to a user of the man-machine interface.

According to one embodiment, the opening of the housings is covered with a transparent or semitransparent surface.

In one embodiment, control means such as, for example, contact detectors are associated with the transparent or semitransparent surface in order to form a touch-sensitive surface.

According to one embodiment, the control means of the screen module are connected to a connector of the man-machine interface outside this screen module.

The invention also relates to a man-machine interface comprising a module of a multifunction screen arranged in a housing having a screen opening designed to allow a user to view information displayed on this screen, characterized in that the screen module is furnished with specific control means and in that the housing accommodates a control panel furnished with at least one control and/or at least one indicator, of an independent function of the screen.

In one embodiment, the screen opening masks, totally or partially, the contour of the screen with respect to a user of the man-machine interface.

In one embodiment, the screen opening is covered by a transparent or semitransparent surface that may comprise control means such as contact detectors in order to form a touch-sensitive surface.

According to one embodiment, the control means of the screen module are connected to a connector of the man-machine interface outside this screen module.

Finally, the invention also relates to a method for assembling a man-machine interface comprising a multifunction screen arranged in a housing designed to be housed in the dashboard of a vehicle, characterized in that, since the interface conforms to one of the preceding embodiments, this man-machine interface is inserted into the dashboard as a single unit.

Figure 4:
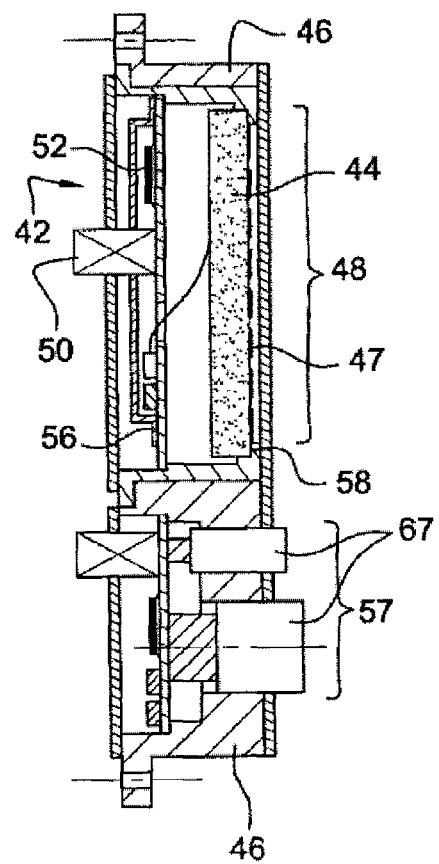
Figure 5:
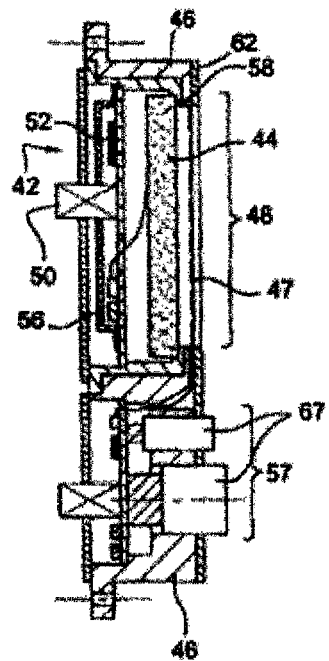
Figure 6:
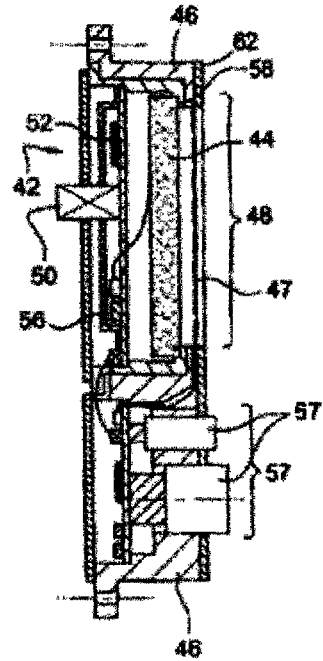
Figure 7:
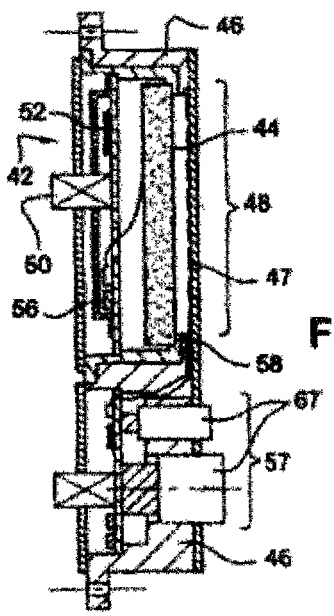
Figure 8:
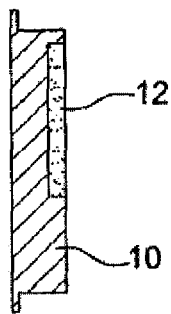
Figure 8:
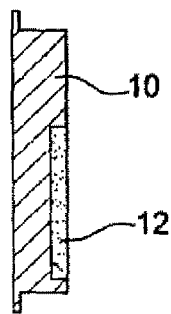
Figure 8:
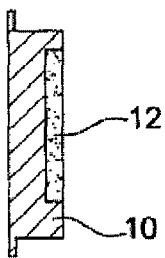
Figure 8:
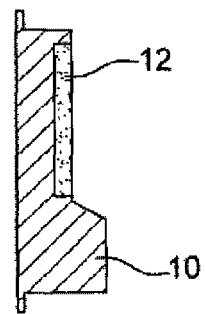
Figure 8:
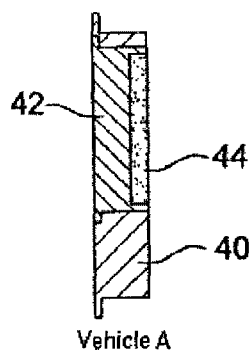
Figure 8:
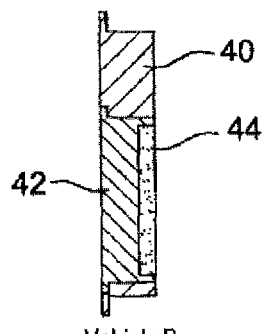
Figure 8:
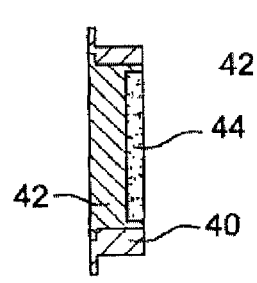
Figure 8:
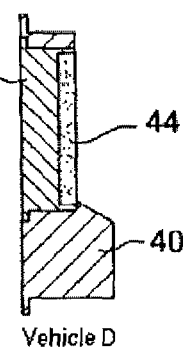

Other features and advantages of the invention will emerge clearly from the description given thereof below, as an indication and in no way limiting, with reference to the various appended figures which show:

in FIG. 1, already described, a view in section of a known man-machine interface furnished with a multifunction screen, in FIGS. 2 to 4, views in section of man-machine interfaces according to the invention furnished with a touch-sensitive screen, in FIGS. 5 to 7, views in section of man-machine interfaces according to the invention furnished with a surface for covering the screen opening with a touch-sensitive screen, and in FIG. 8, a schematic comparison of known man-machine interfaces with man-machine interfaces according to the invention.

DESCRIPTION OF THE PREFERRED EMBODIMENTS OF THE INVENTION

The identical elements, by structure or by function, that appear in various figures retain the same references unless specified otherwise.

With reference to FIG. 2, a man-machine interface 40 comprising a multifunction screen 44 module 42 is arranged in a housing 46 having a screen opening 48 designed to allow a user to view information displayed on this screen 44.

According to the invention, the module 42 is furnished with specific control means, namely in this embodiment a connector 50 and a microcontroller 52 attached to a printed circuit 56 of the module 42.

Thus, the module 42 can easily be inserted into various man-machine interfaces without requiring notably an adaptation of the control means of the other elements associated with these interfaces.

Therefore, one and the same module 42 can be produced in high numbers in order to be arranged in various interfaces 40 without requiring an adaptation of the control means of these interfaces 40, which reduces the cost of these modules 42 and of these interfaces 40.

Such arrangements are illustrated in FIG. 8 for various types of man-machine interfaces of vehicles A, B, C or D, these interfaces being schematically represented in section during their manufacture according to a manufacturing method according to the prior art ("BEFORE") or according to the invention ("AFTER").

It appears that, unlike the interfaces 10 incorporating a screen 12 according to the prior art, the interfaces 40 according to the invention incorporate a screen 44 with the aid of one and the same module 42 even for the various vehicles A, B, C and D so as to limit the manufacturing cost of these interfaces.

In order however to make it possible to give a specific style to each of the interfaces manufactured according to the invention, the screen opening 48 (FIGS. 2 to 7) of each interface can be specific, notably in order to mask, totally or partially, a contour 58 of the screen 44 with respect to a user of the man-machine interface.

By adapting the form of this opening as a function of the model and/or of the range of vehicle for which the interface is designed, it is then possible to adapt the style and/or the design of the interface 40 notwithstanding the use of a common module 42.

In certain variants of the invention shown in FIGS. 2 to 4, the screen is furnished with a surface furnished with touch-sensitive control means 47 making it possible to control the operation of the interface simply by contact.

In other variants—FIGS. 5 to 7—in which the screen opening 48 is covered by a transparent or semitransparent surface 60, this surface 60 is furnished with these touch-sensitive control means 47 comprising notably contact detectors. The opening of the housing is covered with a transparent or semi-transparent surface 62.

Irrespective of the presence/location of the touch-sensitive surface, it should be noted that one and the same transparent or semitransparent surface can cover the façade of the man-machine interface as illustrated in FIGS. 4 and 7. Thus, the interface 40 is furnished with a smooth and even surface.

According to a variant shown in FIGS. 3 and 6, the means for controlling the screen module—in this instance the connector 50—can be used by elements of the man-machine interface that are outside the screen module. Such an application is notably of value when a single connector is required for the whole of the man-machine interface, in which case an internal link can connect the screen module 42 to these elements.

Finally, it should be noted that the invention has the advantage of allowing a simple and rapid integration of various control elements in the dashboard.

Specifically, a man-machine interface 40 comprises, in one and the same housing, a screen module and a dashboard 57 furnished with at least one control button 67 and/or at least one indicator, relating to an independent function of the screen.

For example, if the screen displays exclusively information relating to satellite positioning, the dashboard 57 may comprise controls relating to the air conditioning.

In this case, the assembly of this dashboard and of the screen module in the dashboard is easy since they can be incorporated in a single unit.

The present invention is open to many variants. Notably, it is possible to cover the surface with a pigment, for example in the form of a layer or a deposit of paint, by screen printing or by sticking a plastic film, for example in order to produce a reduction in transparency and/or in order to generate an opaque mask designed to mask technical elements of the interface.

Similarly, the façade of the interface can be furnished with various elements—switches, controls—and/or various technologies can be used to perform the functions described in the invention. As an example, resistive or capacitive touch sensors can be used to obtain a touch-sensitive surface.

The invention claimed is:

1. A method for manufacturing a man-machine interface comprising a module of a multifunction screen arranged in a housing having a first opening for allowing a user to view information displayed on the multifunction screen, the multifunction screen comprising a second opening, wherein the module of the multifunction screen is furnished with specific control means, the method comprising:

manufacturing the man-machine interface by arranging the module of the multifunction screen in the housing which houses a control panel, furnished with at least one of at least one control and at least one indicator, of an independent function of the multifunction screen, wherein only the first opening of the housing is covered with a transparent or semitransparent surface, the second opening of the multifunction screen remaining uncovered by the transparent or semitransparent surface.

2. The manufacturing method as claimed in claim 1, wherein the housing of the man-machine interfaces has various shapes of the first opening.

3. The manufacturing method as claimed in claim 2, wherein the first opening masks, in a distinct manner, a contour of the multifunction screen with respect to a user of the man-machine interface.

4. The manufacturing method as claimed in claim 1, wherein the control means are associated with the transparent or semitransparent surface.

5. The manufacturing method as claimed in claim 1, wherein the control means of the module of the multifunction screen are linked to a control panel connector via a link internal to the man-machine interface.

6. The manufacturing method as claimed in claim 1, wherein the control means is a transparent touch-sensitive control means which covers the second opening of the multifunction screen.

7. A man-machine interface comprising:
a module of a multifunction screen arranged in a housing having a first opening for allowing a user to view information displayed on the multifunction screen, the multifunction screen comprising a second opening, wherein the module of the multifunction screen is furnished with specific control means and the housing accommodates a control panel furnished with at least one of at least one control and at least one indicator, of an independent function of the screen, and wherein only the first opening of the housing is covered by a transparent or semitransparent surface, the second opening of the multifunction screen remaining uncovered by the transparent or semitransparent surface.

8. The man-machine interface as claimed in claim 7, wherein the first opening masks, totally or partially, a contour of the multifunction screen with respect to a user of the man-machine interface.

9. The man-machine interface as claimed in claim 7, wherein the transparent or semitransparent surface are associated with the control means.

10. The man-machine interface as claimed in claim 7, wherein the control means of the module of the multifunction screen are connected to a connector of the control panel via a connection internal to the module of the multifunction screen.

11. The man-machine interface as claimed in claim 7, wherein the control means is a transparent touch-sensitive control means which covers the second opening of the multifunction screen.

12. A method for assembling a man-machine interface comprising a multifunction screen arranged in a housing configured to be placed in a dashboard of a motor vehicle, the method comprising:
inserting the man-machine interface into the dashboard as a single unit, wherein the man-machine interface is according to claim 7.

* * * * *